United States Patent [19]

Teller et al.

[11] Patent Number: 4,968,661
[45] Date of Patent: Nov. 6, 1990

[54] OXIDATION CATALYST AMENDED BY EXAMINER

[75] Inventors: Raymond G. Teller, Aurora; Ann M. Ebner, Lyndhurst; Christopher Bodolus; Victor R. Gupta, both of Cleveland Heights, all of Ohio

[73] Assignee: The Standard Oil Company, Cleveland, Ohio

[21] Appl. No.: 433,678

[22] Filed: Nov. 8, 1989

Related U.S. Application Data

[60] Continuation-in-part of Ser. No. 305,981, Feb. 2, 1989, abandoned, which is a division of Ser. No. 144,800, Jan. 15, 1988, Pat. No. 4,836,117.

[51] Int. Cl.$^5$ .................. B01J 21/06; B01J 23/02; B01J 23/10
[52] U.S. Cl. .................. 502/304; 502/306; 502/308; 502/338; 502/340; 502/349
[58] Field of Search .............. 502/306, 340, 304, 308, 502/338, 349

[56] References Cited

U.S. PATENT DOCUMENTS

| | | | |
|---|---|---|---|
| 3,360,330 | 12/1967 | Hoekstra | 502/306 X |
| 3,885,020 | 5/1975 | Whelan | 423/245 |
| 3,926,854 | 12/1975 | Whelan et al. | 252/462 |
| 3,947,380 | 5/1976 | Whelan et al. | 252/462 |
| 3,976,599 | 8/1976 | Whelan | 252/462 |
| 4,076,486 | 2/1978 | Whelan | 431/5 |
| 4,124,689 | 11/1978 | Whelan | 423/437 |
| 4,124,697 | 11/1978 | Whelan | 423/580 |
| 4,172,810 | 10/1979 | Mitchell et al. | 252/465 |
| 4,205,194 | 5/1980 | Mitchell et al. | 585/407 |
| 4,239,658 | 12/1980 | Mitchell et al. | 252/465 |
| 4,515,092 | 5/1985 | Walsh et al. | 110/347 |
| 4,537,873 | 8/1985 | Kato et al. | 502/340 X |
| 4,559,316 | 12/1985 | Mazaner et al. | 502/73 |
| 4,575,383 | 5/1986 | Lowther et al. | 48/212 |
| 4,686,068 | 8/1987 | Saida et al. | 252/632 |
| 4,752,302 | 6/1988 | Bowers et al. | 44/68 |

FOREIGN PATENT DOCUMENTS

| | | |
|---|---|---|
| 85/00141 | 4/1985 | PCT Int'l Appl. |
| 385/00186 | 5/1985 | PCT Int'l Appl. |

Primary Examiner—W. J. Shine
Attorney, Agent, or Firm—Raymond F. Keller; David J. Untener; Larry W. Evans

[57] ABSTRACT

High-temperature, attrition resistant, oxidation catalysts are disclosed. These catalysts are represented by the formula $$A_u MO_w[(DO_x)(EO_y)_a]_z$$

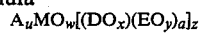

wherein A is an alkali or alkaline earth metal; M is V, Cr, Mo, Mn, Fe, Co, Ni, Cu or a mixture of two or more thereof; D is Zr, Ti, Hf, Ce, Th, Pr, Nb, Ta, W, Re or a mixture of two or more thereof; E is Ca, Mg, Sr, Ba, Y, La, Yb, Sm, Gd, Nd, Sc, V, Bi, Ce, Pr, Eu, Tb, Dy, Ho Er, Tm, Lu or a mixture of two or more thereof; a is a number in the range of zero up to about 0.2; u is a number in the range of zero to about 1; w is the number of oxygens needed to fulfill the valence requirement of A and M; x is the number of oxygens needed to fulfill the valence requirements of D; y is the number of oxygens needed to fulfill the valence requirements of E; and z is a number in the range of about 10 to about 100. This invention further provides for the use of such catalysts in processes involving the combustion of organic materials (e.g., carbonaceous fuels, organic waste materials, etc.) and the autothermal pyrolysis of methane and/or natural gas.

7 Claims, 2 Drawing Sheets

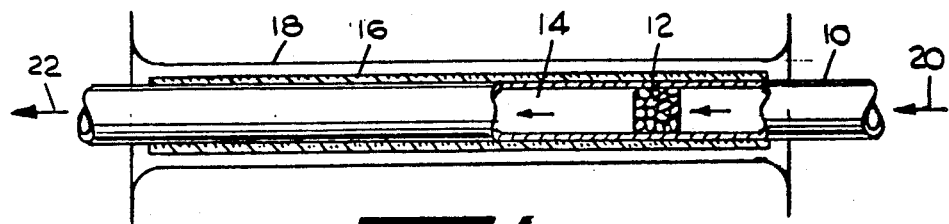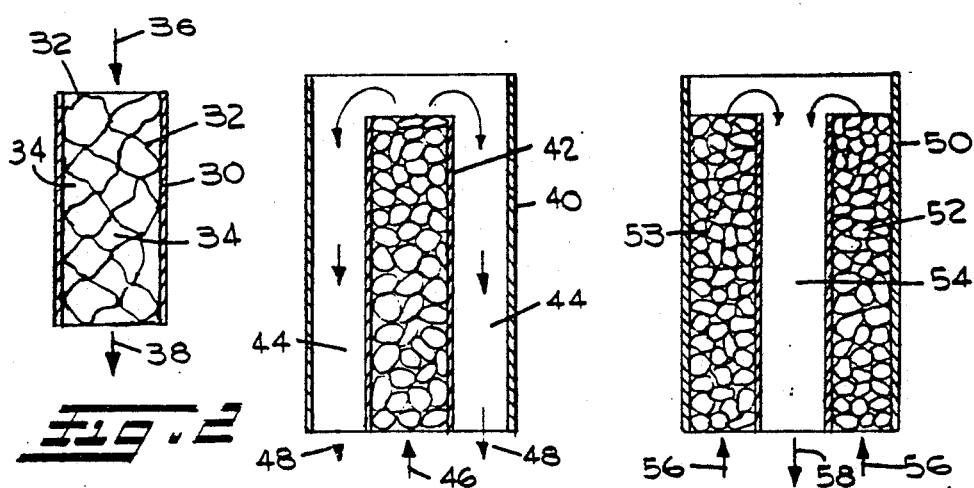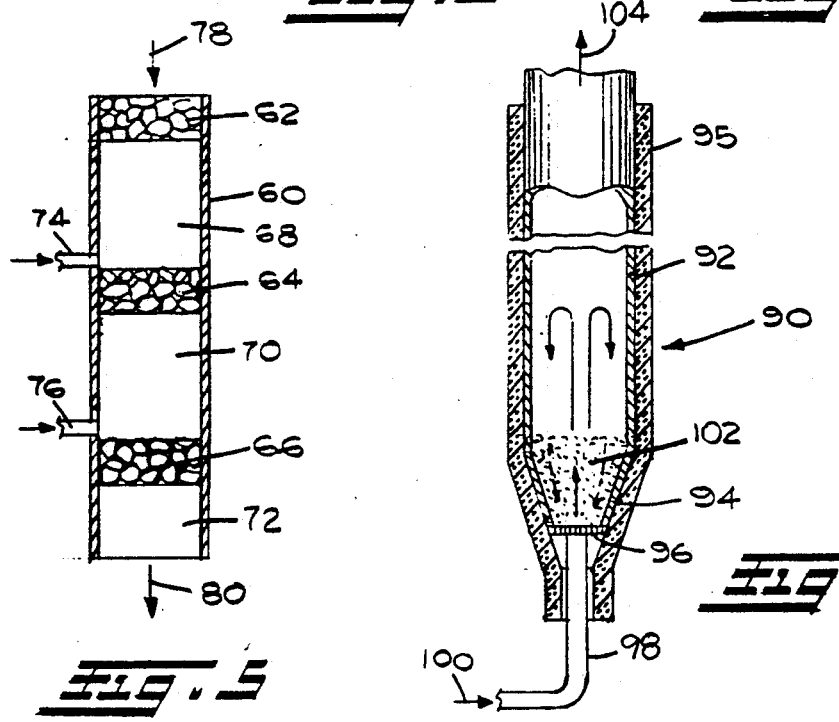

OXIDATION CATALYST AMENDED BY EXAMINER

This application is a continuation-in-part of U.S. application Ser. No. 07/305,981, filed Feb. 2, 1989, now abandoned, which is a division of U.S. application Ser. No. 07/144,800, filed Jan. 15, 1988 (now U.S. Pat. No. 4,836,117). These prior applications are incorporated by reference herein in their entireties.

TECHNICAL FIELD

This invention relates to oxidation catalysts and to processes for using same. The catalysts comprise certain non-noble metals dispersed throughout the lattice of refractory or high-temperature-resistant oxide complexes. The processes with which these catalysts can be used include the combustion of organic materials (e.g., carbonaceous fuels, organic waste materials, etc.) and the autothermal pyrolytic conversion of methane and/or natural gas to higher order hydrocarbons.

BACKGROUND OF THE INVENTION

Combustion is an exothermic oxidation reaction in which the heat evolved results from the formation of carbon oxygen bonds. For each carbonaceous material there is a specific carbon to oxygen ratio that ideally corresponds to complete or stoichiometric combustion. The terms "complete combustion" and "stoichiometric combustion" are used herein to refer to the conversion of a carbonaceous material to $CO_2$ with no CO being produced. Complete combustion is often desirable because the production of heat is maximized and the production of pollutants (e.g., carbon monoxide) is eliminated. Complete or stoichiometric combustion of methane, acetylene, ethylene, ethane, propane, butane and benzene can be represented by the following equations:

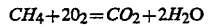

$$CH_4 + 2O_2 = CO_2 + 2H_2O$$

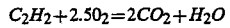

$$C_2H_2 + 2.5O_2 = 2CO_2 + H_2O$$

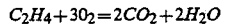

$$C_2H_4 + 3O_2 = 2CO_2 + 2H_2O$$

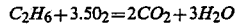

$$C_2H_6 + 3.5O_2 = 2CO_2 + 3H_2O$$

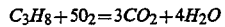

$$C_3H_8 + 5O_2 = 3CO_2 + 4H_2O$$

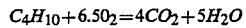

$$C_4H_{10} + 6.5O_2 = 4CO_2 + 5H_2O$$

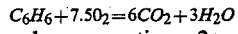

$$C_6H_6 + 7.5O_2 = 6CO_2 + 3H_2O$$

In the above equations, 2 moles of oxygen are required per mole of methane to achieve complete or stoichiometric combustion of methane; 2.5 moles of oxygen are needed per mole of acetylene to achieve complete or stoichiometric combustion of acetylene; 3 moles of oxygen per mole of ethylene are needed to achieve complete or stoichiometric combustion of acetylene; etc. Similar equations can be used to represent the complete or stoichiometric combustion of other carbonaceous materials. The amount of air required for a stoichiometric mixture for many carbonaceous fuels is provided in Perry, J. H., et al, Editors, "Chemical Engineer's Handbook", Fourth Edition (1963) at pp. 9–31 to 9–33.

In large-scale or commercial operations involving the combustion of carbonaceous fuels, it is usually not possible to obtain complete combustion with only a stoichiometric amount of oxygen or air. It is thus common practice to add excess oxygen or air (that is, oxygen or air in excess of stoichiometric amount required to provide complete combustion) to effect complete or substantially complete combustion. Excess oxygen or air is typically added to the combustion reaction until carbon monoxide in the product gases is eliminated or reduced to acceptable levels. The amount of excess oxygen or air required depends on many factors including the particular carbonaceous fuel being burned, the type of burner or furnace being used, etc. A gaseous fuel can be easily mixed with oxygen or air and thus is the easiest type of carbonaceous fuel with which to obtain complete combustion. Commercial burners are available which can operate with as little as up to about 10% excess air and still obtain complete combustion. Liquid fuels are less easily mixed with air and often require up to about 20% or more excess air. Solid fuels often require from up to about 50% or more excess air for economical combustion and usually still leave some unburned carbon in the ash residue. Adding excess oxygen or air has certain disadvantages. The excess oxygen or air decreases the efficiency of the combustion process by reducing its ultimate obtainable temperature and by increasing the size of the equipment necessary to convert all of the carbonaceous fuel to carbon dioxide. The use of oxidation catalysts to enhance combustion and thereby eliminate the requirement for excess oxygen or air has been suggested, but to date no oxidation catalyst has been developed that is entirely satisfactory.

The concept of combusting or incinerating organic waste originated in England about 100 years ago. The first U.S. incinerator was built on Governor's Island, N.Y., in 1885, and the first municipal incinerator was one of 27 metric tons per day capacity constructed at Allegheny City, Pa., in the same year. By 1921 more than 200 municipal incinerators were in operation. These early incinerators were little better than an enclosed bonfire. Small, individual, backyard incinerators were a popular means of disposal of waste in the 1930–1940's in communities without waste-collection facilities. They were, however, sources of air pollution and are now generally prohibited. Today it is possible to build large, advanced central incineration plants which are virtually nuisance-free and environmentally acceptable.

Due to the cost of energy consumption, combustion is not the cheapest method for the disposal of organic waste. Landfill is generally cheaper, but the growing shortage of disposal sites near population centers, the increasing cost of transportation, and the growing reluctance of smaller communities and rural areas to accept waste from other localities has significantly reduced the viability of this technique as a future disposal method. Composting and biodegradation of organic wastes has not been successful on a large scale.

The disposal of solid waste and/or hazardous waste, including petroleum waste and refinery sludge is particularly troublesome. The term "solid waste" refers to any garbage, sludge or other solid organic waste material. The term "hazardous waste" refers to solid waste or combinations of solid waste which are "listed" by the Environment Protection Agency (EPA) as hazardous, or which exhibit ignitability, corrosivity or reactivity, or are considered toxic pursuant to relevant governmental rules or regulations. The term "petroleum waste" refers to any waste material containing petroleum or hydrocarbon oil; petroleum waste can have particulate solids and/or water intermixed with it. The term "refinery sludge" refers to sludges generated in petroleum refinery operations that contain petroleum or hydrocarbon oils; these sludges can contain particulate solids as well as water and the hydrocarbon oils in these sludges usually contain heavy residual hydrocarbons including asphaltenes. Historically, these waste materials have been economically disposed of by land-filling and land-farming techniques. However, land disposal is now regulated by the Resource Conservation and Recovery Act (RCRA) and the Hazardous and Solid Waste Amendments of 1984 (RITA), and has consequently become more difficult and expensive.

Combustion or incineration appears to be an environmentally acceptable means for the disposal of organic waste, but the cost of this technique has limited its application. Catalytic combustion or incineration has been suggested for the purpose of reducing the operating temperature and thus the cost of such combustion or incineration. Catalysts that have been suggested include noble metals (e.g., platinum, palladium) dispersed on the surface of a catalyst support (e.g., silica honeycomb or screen of nichrome wire). These catalysts have, however, been found to be costly and subject to poisoning or blanketing which reduces their activity.

A major source of methane is natural gas which typically contains about 40–95% methane depending on the particular source. Other constituents include about 10% of ethane with the balance being made up of $CO_2$ and smaller amounts of propane, the butanes, the pentanes, nitrogen, etc. Primary sources for natural gas are the porous reservoirs generally associated with crude oil reserves. From these sources come most of the natural gas used for heating purposes. Quantities of natural gas are also known to be present in coal deposits and are by-products of crude oil refinery processes and bacterial decomposition of organic matter.

Prior to commercial use, natural gas must be processed to remove water vapor, condensible hydrocarbons and inert or poisonous constituents. Condensible hydrocarbons are generally removed by cooling natural gas to a low temperature and then washing the natural gas with a cold hydrocarbon liquid to absorb the condensible hydrocarbons. The condensible hydrocarbons are typically ethane and heavier hydrocarbons. This gas processing can occur at the wellhead or at a central processing station. Processed natural gas typically comprises a major amount of methane, and minor amounts of ethane, propane, the butanes, the pentanes, carbon dioxide and nitrogen. Generally, processed natural gas comprises from about 70% to more than about 95% by volume of methane.

Most processed natural gas is distributed through extensive pipeline distribution networks. As natural gas reserves in close proximity to gas usage decrease, new sources that are more distant require additional transportation. Many of these distant sources are not, however, amenable to transport by pipeline. For example, sources that are located in areas requiring economically unfeasible pipeline networks or in areas requiring transport across large bodies of water are not amenable to transport by pipeline. This problem has been addressed in several ways.

One approach has been to build a production facility at the site of the natural gas deposit to manufacture one specific product. This approach is limited as the natural gas can be used only for one product, preempting other feasible uses.

Another approach has been to liquefy the natural gas using cryogenic techniques and transport the liquid natural gas in specially designed tanker ships. Natural gas can be reduced to 1/600th of the volume occupied in the gaseous state by such cryogenic processing, and with proper procedures, safely stored or transported. These processes, which involve liquefying natural gas to a temperature of about $-162°$ C., transporting the gas, and revaporizing it are complex and energy intensive.

Still another approach involves the use of pyrolysis to convert the natural gas to higher molecular weight hydrocarbons (e.g., substantially liquid hydrocarbons) that can be easily handled and transported. Low-temperature pyrolysis (e.g., to 250° C. and 500° C.) is described in U.S. Pat. Nos. 4,433,192; 4,497,970; and 4,513,164. The processes described in these patents utilize heterogeneous systems and solid acid catalysts. In addition to the solid acid catalysts, the reaction mixtures described in the 4,97,970 and 4,519,109 patents include oxidizing agents. Among the oxidizing agents disclosed are air, $O_2$-$O_3$ mixtures, S, Se, $SO_3$, $N_2O$, NO, $NO_3$, F., etc. High-temperature pyrolysis (e.g., above about 1200° C.) has been suggested. These high-temperature processes are, however, energy intensive and have thus far not been developed to the point where high yields are obtained even with the use of catalysts. Some catalysts that are useful in these processes (e.g., chlorine) are corrosive under such operating conditions.

Autothermal pyrolysis has been suggested as a means for overcoming the high energy requirements for high-temperature pyrolysis. In autothermal pyrolysis an oxidant (e.g., oxygen or air) is co-fed with the natural gas to the reactor. The reaction is substoichiometric in oxygen (that is, not enough oxygen is fed to completely consume, i.e., convert to $CO_x$, all of the hydrocarbon in the feed mixture). The hydrocarbon not burned is available for pyrolysis reactions. In noncatalyzed autothermal pyrolysis processes, the major oxygen containing product is usually carbon monoxide and the major higher order hydrocarbon product is usually acetylene. In catalyzed autothermal pyrolysis, the catalyst provides a more efficient use of the oxygen and the major oxygen-containing product is carbon dioxide. The production of carbon dioxide provides a greater yield of heat than the production of carbon monoxide, and thus catalyzed autothermal pyrolysis processes are more efficient than non-catalyzed processes.

U.S. Pat. Nos. 3,926,854 and 3,947,380 disclose ceramic mixed oxide, non-stoichiometric electrically neutral rare-earth-type catalysts containing rare-earth-type elements and elements of the first transition metal series and optionally alkaline earth metals. These catalysts have the following formula:

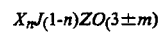

wherein: X is an alkaline earth metal or mixture thereof; J is a rare-earth-type element or mixture thereof; Z is a metal of the first transition series or a mixture thereof, at least 0.01% of said metal having an oxidation state other than $+3$; m is a number having a value of between zero and about 0.11; and n is a number having a value from zero to about 0.51. These patents indicated that these catalysts can be used to catalytically oxidize low molecular weight inorganic compounds and elements, such as ammonia, carbon monoxide, hydrogen, sulfur dioxide, and hydrogen sulfide, with oxygen, or carbon monoxide with water, sulfur dioxide or nitric oxide. The catalyst can also be employed in the catalytic removal of carbon monoxide, hydrocarbons and nitric oxides from the exhaust gases of generating or heating plants and automobiles burning fossil fuels.

U.S. Pat. Nos. 3,885,020; 3,976,599; 4,076,486; 4,124,689; and 4,124,697 disclose ceramic mixed oxide, non-stoichiometric electrically neutral, rare-earth-type catalysts containing rare-earth-type elements, elements of the first transition metal series and zirconium, tin or thorium and optionally alkaline earth metals. These catalysts have the following formula:

$$W_k X_n J_{(1-k-n)} ZO_{(3 \pm m)}$$

wherein: W is zirconium, tin or thorium or mixture thereof; X is an alkaline earth metal or mixture thereof; J is a rare-earth-type element or mixture thereof; Z is a metal of the first transition series or a mixture thereof, at least 0.01% of said metal having an oxidation state other than +3; k is a number having a value of between zero and about 0.1; m is a number having a value of from zero to about 0.26, provided m has a value other than zero when n has a value of zero; and n is a number having a value from 0 to about 0.51 provided when n has a value of zero, k has a value of between zero and about 0.05. These patents indicate that these catalysts can be used to catalytically oxidize organic compounds to various states of oxidation, ammonia, carbon monoxide, hydrogen, sulfur dioxide, and hydrogen sulfide, with oxygen, or carbon monoxide with water, sulfur dioxide or nitric oxide. The catalyst can also be employed in the catalytic removal of carbon monoxide, hydrocarbons, nitric oxides and sulfur dioxide from the exhaust gases of generating or heatinq plants and automobiles burning fossil fuels. In addition, these catalysts can be employed to produce hydrogen cyanide from methane, ammonia and oxygen.

SUMMARY OF THE INVENTION

The present invention provides for high-temperature, attrition-resistant, oxidation catalysts represented by the formula $$A_u MO_w[(DO_x)(EO_y)a]_z$$

wherein A is an alkali or alkaline earth metal; M is V, Cr, Mo, Mn, Fe, Co, Ni, Cu or a mixture of two or more thereof; D is Zr, Ti, Hf, Ce, Th, Pr, Nb, Ta, W, Re or a mixture of two or more thereof; E is Ca, Mg, Sr, Ba, Y, La, Yb, Sm, Gd, Nd, Sc, V, Bi, Ce, Pr, Eu, Tb, Dy, Ho, Er, Tm, Lu or a mixture of two or more thereof; a is a number in the range of zero up to about 0.2; u is a number in the range of zero to about 1; w is the number of oxygens needed to fulfill the valence requirement of A and M; x is the number of oxygens needed to fulfill the valence requirements of D; y is the number of oxygens needed to fulfill the valence requirements of E; and z is a number in the range of about 10 to about 100. The invention further provides for the use of such catalysts in processes involving the combustion of organic materials (e.g., carbonaceous fuels, organic waste materials, etc.) and the autothermal pyrolysis of methane and/or natural gas.

BRIEF DESCRIPTION OF THE DRAWINGS

FIG. 1 is a partially cut-away view of a tubular reactor suitable for use in operating an autothermal pyrolysis process in accordance with one embodiment of the invention.

FIG. 2 is a schematic illustration of a reactor that is suitable for use in operating an autothermal pyrolysis process in accordance with another embodiment of the invention.

FIG. 3 is a schematic illustration of a reactor that is suitable for use in operating an autothermal pyrolysis process in accordance with another embodiment of the invention.

FIG. 4 is a schematic illustration of a reactor that is suitable for use in operating an autothermal pyrolysis process in accordance with another embodiment of the invention.

FIG. 5 is a schematic illustration of a reactor that is suitable for use in operating an autothermal pyrolysis process in accordance with another embodiment of the invention.

FIG. 6 is a schematic illustration of a reactor that is suitable for use in operating an autothermal pyrolysis process accordance with another embodiment of the invention.

DESCRIPTION OF THE PREFERRED EMBODIMENTS

Figure 7:
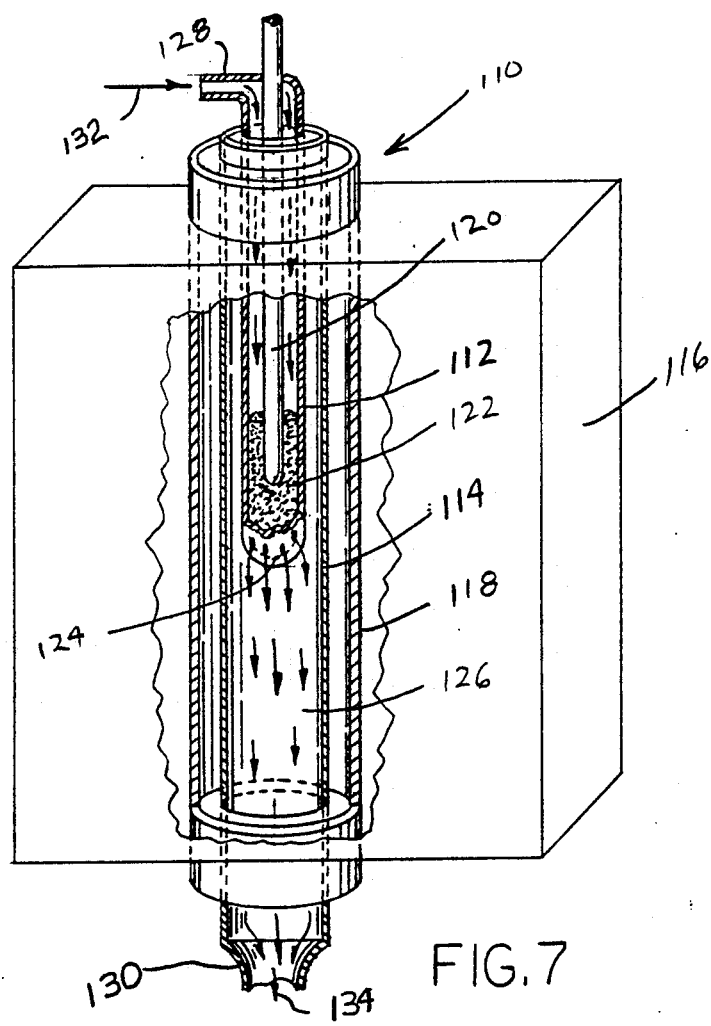
FIG. 7 is a partially cut-away view of a reactor for operating an autothermal pyrolysis process of the invention in accordance with another embodiment of the invention.

Catalyst:

The inventive catalysts are comprised of one or more of non-noble metals dispersed throughout the lattice of a high-refractory or high temperature-resistant oxide complex. These catalysts can be represented by the formula $$A_u MO_w[(DO_x)(EO_y)a]_z$$

wherein

A is an alkali or alkaline earth metal, preferably Li, Na, K, Rb, Be, Mg, Ca or a mixture of two or more thereof;

M is V, Cr, Mo, Mn, Fe, Co, Ni, Cu or a mixture of two or more thereof, preferably V, Fe or Cr;

D is Zr, Ti, Hf, Ce, Th, Pr; Nb, Ta, W, Re or a mixture of two or more thereof, preferably Zr, Ce or Th;

E is Ca, Mg, Sr, Ba, Y, La, Yb, Sm, Gd, Nd, Sc, V, Bi, Ce, Pr, Eu, Tb, Dy, Ho, Er, Tm, Lu or a mixture of two or more thereof, preferably Ca, Mg, Y or La;

a is a number in the range of zero up to about 0.2, preferably about 0.05 to about 0.08;

u is a number in the range of zero to about 1;

w is the number of oxygens needed to fulfill the valence requirements of A and M;

x is the number of oxygens needed to fulfill the valence requirements of D;

y is the number of oxygens needed to fulfill the valence requirements of E; and z is a number in the range of about 10 to about 100, preferably about 15 to about 30.

In the above formula the complex within the brackets "[ ]" represents the lattice structure. A functions primarily as a catalytic modifier. M functions primarily as a catalytically active metal. D functions primarily as a refractory metal; it is chosen to provide a high temperature and attrition-resistant oxide complex. E functions primarily as a stabilizing element. The value of z is preferably chosen to insure that the catalyst is a high refractory or high-temperature resistant material.

With the inventive catalysts, the most abundant metallic element is D, hence the physical properties of the inventive catalysts are similar to those of $DO_x$-type materials. Since element D is chosen to form a high-temperature and attrition-resistant oxide, the inventive catalysts are highly resistant to attrition and high-temperature degradation. They exhibit longer useful lifetimes under routine combustion conditions than catalysts suggested in the prior art, and they can be used in demanding applications (e.g., ultra-high temperature and attrition conditions) wherein catalysts suggested in the prior art cannot be used.

The inventive catalysts can be prepared by dissolving a salt or sol of the refractory metal oxide, $DO_x$, in water (or other appropriate solvent) and introducing soluble species or slurries of reagents that contain the stabilizing element E, the catalytically active element M and the modifying element A. Salts that are suitable include nitrates, acetates, halides, carbonates, sulphates, phosphates, tartrates, alkoxides, hydrated oxides, and the like. The mixture is heated until the water or other solvent is driven off. The dried mixture is then heat treated at temperature up to about 1500° C., preferably about 700° C. to about 900° C., for about 1 to about 24 hours. Alternately, the refractory oxide stabilizing element lattice is preformed and then impregnated with the catalytically active element and modifying element and fired at a temperature up to about 1500° C., preferably about 700° C. to about 900° C.

In order to further illustrate the preparation of the catalysts of the invention, the following examples are provided. In the following examples as well as throughout the specification and in the appended claims, all parts and percentages are by weight and all temperatures are in degrees centigrade, unless otherwise indicated.

EXAMPLE 1

A catalyst of composition $VZr_{30}O_{62.5}$ was prepared in the following manner: 36.97 gms. of $ZrO_2$ were slurried in 200 ml. of water. 1.17 gms. of $NH_4VO_3$ were added to this slurry and the pH was adjusted to 12 by the addition of a concentrated $NH_3$ solution. This slurry was heated at reflux for 16 hours then evaporated to near dryness. The catalyst was heat treated in air at 120° C. for 16 hours.

EXAMPLE 2

A calcium stabilized catalyst of a similar composition to that in Example 1 was prepared as follows: 36.97 gms. of Ca stabilized $ZrO_2$ were slurried in 200 ml. of water. 1.17 gms. of $NH_4VO_3$ were added to this slurry and the pH was adjusted to 12 by the addition of a concentrated $NH_3$ solution. This slurry was heated at reflux for 18 hours then evaporated to near dryness. The catalyst was heat treated in air at 120° C. for 16 hours.

EXAMPLE 3

A catalyst of composition $CrZr_{30}O_{61.5}$ was prepared in the following manner: 37.0 gms. of $ZrO_2$ were slurried in 200 ml. of water. 4.0 gms. of $Cr(NO_3)_3.9H_2O$ were added to this slurry. This slurry was heated at reflux for 16 hours then evaporated to near dryness. The catalyst was heat treated in air at 120° C. for 16 hours.

EXAMPLE 4

A catalyst of composition $CrZr_{30}O_{61.5}$ and also containing Ca to stabilize the cubic form of zirconia at room temperature was prepared in the following manner: 37.0 gms. of $ZrO_2$ were slurried in 200 ml. of water. 4.0 gms. of $Cr(NO_3)_3.9H_2O$ were added to this slurry. This slurry was heated at reflux for 16 hours then evaporated to near dryness. The catalyst was heat treated in air at 120° C. for 16 hours.

EXAMPLE 5

A catalyst of composition $FeZr_{30}O_x$ was prepared in the following manner: 37.0 grams of $ZrO_2$ were slurried in 200 ml of water. 4.0 grams of $Fe(NO_3)_3.9H_2O$ were added, and the mixture was heated at reflux for 16 hours. The mixture was evaporated to near dryness, then dried at 120° C. for 16 hours. The catalyst was calcined at 290° C. and 425° C. for 3 hours each, then heated at 900° C. for 16 hours. The resulting catalyst was then ground to 20–35 mesh.

COMBUSTION OF ORGANIC MATERIALS

This process involves contacting an organic material with the inventive catalyst in the presence of an oxygen source under reaction conditions for an effective period of time to effect a combustion reaction sufficient to burn or incinerate a desired amount of the organic material.

The organic material combusted in accordance with the inventive process can be a carbonaceous fuel. The fuel can be a solid, liquid, gas or mixture thereof. Examples of solid fuels include coal, coke, char, petroleum coke, charcoal, tanbark, bagasse and the like, as well as mixtures of two or more thereof. Examples of liquid fuels inClude fuel oil (especially distillate and residual fuel oils), coal tar, tar oil, gasoline, kerosene, alcohol, benzol and the like, as well as mixtures of two or more thereof. Examples of gaseous fuels include natural gas (i.e., wellhead or processed natural gas), hydrocarbons containing from about 1 to about 5 carbon atoms (e.g., methane, ethane, ethylene, acetylene, propane, propylene, the butanes, the butylenes, the pentanes, the pentylenes, etc.), liquid petroleum gas (LPG), blast furnace gas, blue water gas, carbureted water gas, coal gas, coke-oven gas, oil gas, producer gas, re-formed gas and the like, as well as mixtures of two or more of these. Mixtures of these gaseous fuels with hydrogen can also be used. A listing of additional fuels that can be combusted in accordance with the invention is provided in Perry, J. H., et al, Editor, "Chemical Engineer's Handbook", Fourth Edition (1963) at pp. 9–31 to 9–33 which are incorporated herein by reference.

The organic material that can be combusted in accordance with the invention can also be an organic waste material. These waste materials can be in the form of a solid, liquid, gas or mixture thereof. These organic waste materials can include water and/or particulate solids intermixed with the organic material. Examples include: mixed solid combustible materials (e.g., paper, wood); low-heating value carbonaceous fuels; pumpable, high heating value, moderately low ash, high moisture waste (e.g., skimmer emulsions, tank bottoms, heavy ends); wet semisolids (e.g., refuse and water-treatment sludge); uniform, solid burnables (e.g., waste polymers); pumpable, high ash, low heating value materials (e.g., acid or caustic sludges or sulfonates); difficult or hazardous materials (e.g., toxic compounds, hydrofluoric acid, pesticide residues); difficult to burn organic wastes (e.g., chlorinated organics; carbonbound, nitrogen-containing compounds). Organic waste materials that are particularly suitable for combustion or incineration in accordance with this invention include solid waste, hazardous waste, refinery sludge, petroleum waste, dilute hydrocarbon streams, chlorinated hydrocarbons and the organics from disposal streams generated during the production of acrylonitrile which comprise complex mixtures of various nitriles, (e.g., acetonitrile, acrylonitrile, proprionitrile, acrylic acid, fumeronitrile, succinonitrile, pyridine, methyl pyridines, picolene, acrylamide, acetamide, and the like, as well as mixtures thereof).

The oxygen source can be pure or substantially pure oxygen or oxygen diluted with nitrogen (e.g., air), carbon dioxide, carbon monoxide, or other inert gases (e.g., noble gases such as helium, neon, argon, etc.). Preferably, the oxygen source is air. The amount of oxygen employed is preferably equal to or in slight excess of the stoichiometric amount needed to convert the carbonaceous materials in the organic material to carbon dioxide.

This process can be carried out by contacting a mixture of the organic material and the oxygen source with the inventive catalyst described above in a fluid bed reactor, fixed bed reactor, spouted bed reactor or any other suitable reactor configuration such as a moving bed reactor. The reaction can be conducted in a continuous or a batch-type mode. The reaction temperature is preferably at least about 600° C., more preferably in the range of about 700° C. to about 1400° C., more preferably from about 750° C. to about 1200° C.

In one embodiment the catalyst is in the form of a bed of particulate solids and the organic material is in the form of a liquid or gas. A mixture of the organic material and an oxygen source (e.g., air) is advanced through the bed and combusts in the bed. A supplemental gaseous fuel (which can be any of the gaseous fuels discussed above) can be advanced through the bed to aid combustion.

The reaction can be conducted at sub-atmospheric, atmospheric or at elevated pressures up to about 20 atmospheres. Generally, the reaction is conducted at a pressure of from about 1 to about 3 atmospheres, and more preferably about one atmosphere.

The contact time of the mixture of organic material and oxygen source with the catalyst is generally a time which is sufficient to provide the desired combustion of organic material. The contact time is preferably in the range of about 0.001 to about 20 seconds, more preferably about 0.1 to about 8 seconds, more preferably about 3 to about 6 seconds.

The following example is illustrative of the inventive process for combusting an organic waste material.

EXAMPLE 6

The organic waste material was a dilute waste stream consisting of an aqueous mixture having a 3-4 weight percent organic and 3-4 weight percent inorganic content. The organic constituents were acetonitrile, acrylonitrile, proprionitrile, acrylic acid, fumeronitrile, succinonitrile, pyridine, methyl pyridine, picolene, acrylamide, acetamide, nicotinamide and acetamide. The total oxidizable carbon (TOC) content of the sample prior to treatment was 2302 mg/l. A total of 0.46 cc/−min. of this waste stream was passed over the catalyst of Example 1 (7 cc of catalyst) at 750° C. At the same time approximately 22 cc/min. of air was passed over the catalyst. Gas chromatographic analysis of the effluent indicated that approximately 99% of the organics had been converted to $CO_2$. The TOC content of the effluent was 20 mg/l.

AUTOTHERMAL PYROLYSIS OF METHANE AND/OR NATURAL GAS

This process involves contacting a feedstock comprising methane and/or natural gas with the inventive catalyst in the presence of a substoichiometric amount of an oxygen source under reaction conditions for an effective period of time to provide higher order hydrocarbons, preferably liquid hydrocarbons.

The term "higher order hydrocarbon" refers to a hydrocarbon product having at least one more carbon atom in its structure than the hydrocarbon used in the reactant to form said higher order hydrocarbon. For example, if the reactant comprised methane, and ethane was formed from said reactant, ethane would be a higher order hydrocarbon. The term "liquid hydrocarbon" refers to hydrocarbons that are substantially in the liquid form at a temperature of about 25° C. and a pressure of one atmosphere.

The feedstock comprises methane and/or natural gas and may include additional hydrocarbons, typically containing from 2 to about 5 carbon atoms. These hydrocarbons include, for example, ethane, ethylene, acetylene, propane, propylene, the butanes, the butylenes, the pentanes, the pentylenes, and the like as well as mixtures of two or more of said hydrocarbons. Hydrogen can be mixed with the feedstock. The feedstock preferably contains at least about 50% by volume methane, more preferably from about 50% to about 95% by volume or more methane. The feedstock can contain from zero up to about 25 moles of nitrogen and/or other inert gases (e.g., noble gases such as helium, neon, argon, etc.), per mole of methane. The feedstock can also contain from zero up to about 25 moles of water per mole of methane. The natural gas can be either wellhead natural gas or processed natural gas.

Wellhead natural gas typically contains about 40% to about 95% by volume methane, depending on the particular source; other constituents typically include about 10% by volume ethane with the balance being made up of carbon dioxide and smaller amounts of propane, the butanes, the pentanes, nitrogen, etc. Prior to commercial use, wellhead natural gas is usually processed to remove water vapor, condensible hydrocarbons and inert or poisonous constituents. Condensible hydrocarbons are generally removed by cooling natural gas to a low temperature and then washing the natural gas with a cold hydrocarbon liquid to absorb the condensible hydrocarbons. The condensible hydrocarbons are typically ethane and higher hydrocarbons. This gas processing can occur at the wellhead or at a central processing station. The composition of processed natural gas varies with the needs of the ultimate user. Processed natural gas typically comprises a major amount of methane, and minor amounts of ethane, propane, the butanes, the pentanes, carbon dioxide and nitrogen. Generally, processed natural gas comprises from about 70% to more than about 95% by volume of methane.

The oxygen source can be substantially pure oxygen or oxygen diluted with nitrogen (e.g., air), carbon dioxide, carbon monoxide, or other inert gases (e.g., noble gases such as helium, neon, argon, etc.). Preferably, the oxygen source is air. The mole ratio of oxygen in the oxygen source to methane in the feedstock must be substoichiometric and preferably is in the range of about 0.1 to less than about 1 mole of oxygen per mole of methane. While not wishing to be bound by theory, it is believed that by providing a substoichiometric amount of oxygen in the reaction, the catalyst converts all the oxygen and only some of the methane in the feedstock to $CO_2$ and $H_2O$, thus leaving some unconsumed methane in the effluent with no oxygen being present. Since no oxygen is present in the effluent, and the temperature of the effluent is relatively high, the unconsumed methane undergoes pyrolysis. The combination of the two reactions can be isothermal in that combustion is an exothermic process, while pyrolysis is an endothermic process. Hence heat produced in the combustion reaction can be consumed in the pyrolysis reaction. Since these reactions can be conducted within the same reaction vessel (as discussed in greater detail below) no heat recovery equipment is required (aside from adequate insulation). This represents a major savings over conventional pyrolysis in which heat is applied externally.

This process can be carried out by initially contacting a mixture of the feedstock and the oxygen source with one or more of the inventive catalysts at a reaction temperature that is preferably at least about 900° C., more preferably in the range of about 900° C. to about 1600° C., more preferably in the range of about 1100° C. to about 1400° C. The catalyst is preferably in the form of a bed of particulate solids and the reactor is preferably a fluid bed reactor, fixed bed reactor or spouted bed reactor. The bed of particulate solids is sometimes referred to hereinafter as the catalytic zone of the reactor.

The average contact time of the gaseous reactants with the inventive catalyst is preferably from about 0.001 second to about 0.2 second, more preferably from about 0.001 second to about 0.02 second.

The product of this catalytic reaction step is an intermediate product which comprises primarily $CO_2$, $H_2O$ and unreacted methane. This intermediate product may also comprise other higher molecular weight hydrocarbons (e.g., $C_2$+ hydrocarbons) as well as inert gases that may have been present in the feedstock.

Pyrolysis is effected by heating the intermediate product in an open or void space within a reactor at or near the reaction temperature being employed during the catalytic reaction step until the desired final products have been formed. This open or void space is sometimes hereinafter referred to as the pyrolysis zone. The ratio of the average residence time of the gases flowing through the pyrolysis zone to the average contact time between the gaseous reactant and the catalyst is preferably at least about 2:1, more preferably at least about 5:1, more preferably at least about 10:1, more preferably at least about 50:1, more preferably at least about 100:1, and can be as high as 200:1 or higher. As a consequence, the ratio of the volume of the pyrolysis zone to the volume of the catalysts must also be at least about 2:1, preferably at least about 5:1, more preferably at least about 10:1, more preferably at least about 50:1, more preferably at least about 100:1, and can be as high as 200:1 or higher. The volume of the catalyst herein is the cumulative volume of all the catalyst particles employed in the reaction; this volume can be measured by conventional techniques (e.g., liquid displacement). The average residence time of the gases flowing through the pyrolysis zone is therefore preferably in the range of about 0.01 seconds up to about 0.5 seconds, more preferably about 0.1 seconds to about 0.3 seconds.

The intermediate product and the catalyst are separated prior to pyrolysis The separation can be relatively infinitesimal as, for example, in a loosely packed catalyst bed (see, for example, FIG. 2) wherein pyrolysis is effected in open or void spacings immediately adjacent the catalyst particles. The separation can also involve providing separate catalytic reaction zones and pyrolysis zones within the same reactor (see, for example, FIGS. 1 and 3-7). The separation can also involve providing separate reactors, one for the catalytic reaction step and one for pyrolysis.

The reaction can be conducted at sub-atmospheric, atmospheric or at elevated pressures up to about 5 atmospheres. Generally, the reaction is conducted at a pressure of from about 0.5 to about 2 atmospheres, and more preferably about one atmosphere.

Achievement of the energy efficient potential of the autothermal pyrolysis process of the invention is dependent upon the design of the reactor in which the process is conducted. Preferably, a single reactor is used consisting of an enclosed insulated unit such as a tubular reactor wherein the catalytic zone and pyrolysis zone are in contact so that exothermic heat generated in the catalytic zone can be efficiently transferred by, for example, convection to the pyrolysis zone. An advantage of this invention is that since all or most of the heat required for the pyrolysis step of the reaction is generated within the catalytic zone, the reactor need not be constructed with costly materials that have both high thermal stability and high thermal conductivity characteristics. This is in contrast to conventional pyrolysis reactors which are typically constructed of materials having relatively high thermal stability and high thermal conductivity characteristics due to the fact that the gaseous reactants must be heated up rapidly using external heat and the product mixture must be cooled down rapidly. Reactors that are suitable for use with the autothermal pyrolysis processes of the invention can have various configurations; some of which are depicted in FIGS. 1-7.

In FIG. 1, tubular reactor 10 has a catalytic zone 12 and a pyrolysis zone 14. The catalytic zone contains the catalyst which can be in any of the forms discussed above. The pyrolysis zone consists of an open or void space within the reactor 10. The ratio of the volume of the pyrolysis zOne 14 to the volume of the catalyst is preferably at least about 2:1, preferably at least about 5:1, more preferably at least about 10:1, more preferably at least about 50:1, more preferably at least about 100:1 and can be as high as 200:1 or higher. Tubular reactor 10 is enclosed within insulating jacket 16 and is heated by electric furnace 18. In operation, the feedstream 20 comprising a mixture of feedstock and oxygen source enters the tubular reactor 10, contacts the catalyst for an effective period of time to form an intermediate product. The intermediate product advances through the pyrolysis zone 14 wherein a pyrolysis reaction is effected. Exothermic heat generated in the catalyst zone 12 is transferred, primarily by convection, to pyrolysis zone 14 to provide part or all (depending upon the effectiveness of insulation 16) of the heat necessary to effect the pyrolysis reaction in zone 14. Electric furnace 18 is provided primarily for initial start-up and to compensate for heat loss during operation. The final product exits the tubular reactor 10 as effluent stream 22. The effluent stream can be cooled or further processed using conventional techniques.

FIGS. 2-7 illustrate alternative forms of the reactors in which the autothermal pyrolysis process of the invention can be performed. In each of these reactors the ratio of the volume of the open or void space to the volume of the catalyst particles is preferably at least about 2:1, more preferably at least about 5:1, more preferably at least about 10:1, more preferably at least about 50:1, more preferably at least about 100:1 and as high as 200:1 or higher. With each of these reactors the feedstream comprises a mixture of feedstock and oxygen source as discussed above.

In FIG. 2, the reactor consists of a fixed bed 30 which contains catalyst particles 32 and voids 34. The catalyst particles 32 are of sufficient size and geometry so as to provide the indicated ratios of catalyst volume to void space volume. In operation, the feedstream 36 enters the reactor bed 30, contacts catalyst particles 32 thereby undergoing reaction to an intermediate product. The intermediate product then passes through voids 34 wherein pyrolysis occurs. The exothermic heat generated by the catalytic reaction provides part or all of the heat necessary to effect the pyrolysis reaction. The final product exits the reactor as effluent stream 38.

In FIG. 3, a fixed bed reactor 40 includes a catalyst bed 42 and a pyrolysis zone 44 which consists of an open or void space. Feedstream 46 advances through catalyst bed 42 wherein reaction occurs resulting in the formation of an intermediate product. The intermediate product advances through open space 44 wherein pyrolysis occurs resulting in the formation of the final product. The final product exits the rector as effluent stream 48. The exothermic heat generated in the catalytic reaction provides part or all of the heat necessary for conducting the pyrolysis reaction.

In FIG. 4, a fixed bed reactor 50 includes catalyst beds 52 and 53 and a pyrolysis zone 54 which consists of an open or void space. Feedstream 56 advances through catalyst beds 52 and 53 wherein reaction occurs resulting in the formation of an intermediate product. The intermediate product advances through open space 54 wherein pyrolysis occurs resulting in the formation of the final product. The final product exits the reactor as effluent stream 58. The exothermic heat generated in the catalytic reaction provides part or all of the heat necessary for conducting the pyrolysis reaction.

Referring to FIG. 5, a fixed bed reactor 60 contains catalyst beds 62, 64 and 66. Open spaces 68, 70 and 72 are provided downstream of catalyst beds 62, 64 and 66, respectively. Oxygen source inlets 74 and 76 are provided in the sidewall of reactor 60 for admitting an oxygen source into catalyst beds 64 and 66, respectively. In operation, feedstream 78 enters the reactor 60 and passes sequentially through catalyst bed 62, open space 68, catalyst bed 64, open space 70, catalyst bed 66 and open space 72, and exits the reactor as effluent stream 80. In each of the catalyst beds 62, 64 and 66, a catalytic reaction occurs, while in each of the open spaces 68, 70 and 72 a pyrolysis reaction occurs. Heat generated during the catalytic reaction is transferred primarily by convection from the catalyst beds 62, 64 and 66 to the pyrolysis zones 68, 70 and 72, respectively, and provides part or all of the heat necessary for the pyrolysis reactions. The oxygen source is introduced through inlets 74 and 76 to provide for the catalytic reactions in catalyst beds 64 and 66.

Referring to FIG. 6, fluidized bed reactor 90 includes a vertical column 92 and a conical section 94. Reactor 90 is enclosed within insulating jacket 95. Perforated plate 96 is mounted at the base of the conical section 94. Inlet tube 98 is provided at the bottom of conical section 94 for advancing the feedstream 100 upwardly into the reactor 90. A catalyst bed 102 is contained within conical section 94 on perforated plate 96. In operation, feedstream 100 is advanced upwardly through perforated plate 96 into catalyst bed 102 resulting in the fluidization of bed 102. The catalyst particles are projected upwardly into vertical column 92 by the flow of feedstream 100 and fall back into the bed by the force of gravity. The vertical extent of the column 92 and the flow of feedstream 100 are selected so as to limit or prohibit the escape of catalyst aprticles from the column 92. As the feedstream 100 passes through the catalyst bed 102, a catalytic reaction occurs resulting in the formation of an intermediate product. The intermediate product advances upwardly through column 92 wherein pyrolysis occurs. The final product exits the column 92 as effluent stream 104. Exothermic heat generated during the Catalytic reaction advances upwardly in column 92 from bed 102 by convection and provides part or all of the heat necessary for the pyrolysis reaction.

Referring to FIG. 7, reactor 110 has a small inner tube 112 housed within a larger tube 114. Reactor 110 is housed within furnace 116. Radiation shield 118 surrounds tube 114. Thermowell 120 is provided in inner tube 112 and is adapted for receiving a thermocouple. Catalyst 122 is contained within inner tube 112. Inner tube 112 includes perforations 124 in its bottom to permit gases to flow through the bottom of tube 112. The open space 126 within tube 114 defines a pyrolysis zone. Reactor 110 has an inlet 128 and an outlet 130. In operation, feedstream 132 enters tubular reactor 110 through inlet 128 and advances downwardly through inner tube 112 into contact with catalyst 122. Contact with catalyst 122 is maintained for an effective period of time for a catalytic reaction to occur and an intermediate product to form. The intermediate product advances through perforations 124 in tube 112 into pyrolysis zone 126 wherein a pyrolysis reaction is effected. Exothermic heat generated during the catalytic reaction is transferred, primarily by convection, to pyrolysis zone 126 to provide part or all of the heat necessary to effect the pyrolysis reaction in zone 126. Electric furnace 116 is provided primarily for initial start-up and to compensate for heat loss during operation. The final product exits reactor 110 as effluent stream 134. Effluent stream 134 can be cooled or further processed using conventional techniques.

The overall composition of the higher order hydrocarbon products produced in accordance with this process may vary somewhat depending upon the nature or source of the methane and/or natural gas that are initially used as feedstock, and the conditions under which they are processed. Preferred higher order hydrocarbon products include aliphatic and/or aromatic products that are sufficiently liquid to be readily handleable and transportable in conventional pipeline systems. Included in this preferred group are hydrocarbons containing at least about 5 carbon atoms, more particularly, aromatic compounds containing at least .about 6 carbon atoms (e.g., benzene, xylenes, naphthalenes, etc.).

The following example is illustrative of the autothermal pyrolysis process Of the invention. Unless otherwise indicated, all parts and percentages of products are by weight, and those of feeds are by volume.

EXAMPLE 7

The reactor that was used is illustrated in FIG. 7. Inner tube 112 and larger tube 114 were made of alumina. Radiation shield 118 was made of silicon carbide. Thermowell 120 was made of quartz. The furnace 116 was a standard suitcase furnace. The catalyst, temperature, gas hourly space velocity (GHSV), feed composition and percentage conversion of methane to aromatics are indicated below. Test runs 1-3 were provided for purposes of comparison. Test runs 4-7 are illustrative of the invention. The ratio of the volume of the pyrolysis zone 126 to the volume of the catalyst 122 for test runs 4-7 was 75.

| Run | Catalyst | Temp. (°C.) | GHSV (hr$^{-1}$) | Feed CH$_4$/O$_2$/N$_2$ | % CH$_4$ Conversion to: | | |
|---|---|---|---|---|---|---|---|
| | | | | | 1R* | 2 + R** | Coke |
| 1 | None | 950 | 21270 | 1/.08/.03 | 0.2 | — | — |
| 2 | None | 950 | 23607 | 1/.26/.04 | 0.2 | — | — |
| 3 | ZrO$_2$ | 950 | 22154 | 1/.08/.03 | — | — | — |
| 4 | Prod. of Ex. 1 | >1200 | 7100 | 1/.14/.57 | 3.6 | 2.8 | 5.4 |
| 5 | Prod. of Ex. 5 | >1200 | 54545 | 1/.65/.01 | 2.0 | 2.0 | Tr*** |
| 6 | Prod. of Ex. 5 | >1200 | 71439 | 1/.39/.01 | 2.5 | 2.8 | Tr |
| 7 | Prod. of Ex. 5 | >1200 | 13760 | 1/.35/1.3 | 1.2 | 1.8 | Tr |

*Single ring aromatics (e.g., benzene, toluene, xylene).
**Multiple ring aromatics.
***Tr is an abbreviation for trace.

An advantage of the present invention over externally fired pyrolysis processes in the prior art is that with the present invention, a more efficient use of the heat released upon complete combustion of a portion of the methane (and all the oxygen) in the feed mixture is achieved. This greater efficiency allows for less consumption of methane to combustion products while producing comparable yields of aromatic products.

An advantage of the present invention over non-catalytic autothermal pyrolysis processes in the prior art is that the present invention provides for increased yields in aromatic products over acetylene. Aromatic products are preferred over acetylene.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A catalyst represented by the formula $A_u MO_w[(DO_x)(EO_y)_a]_z$ wherein
A is an alkali or alkaline earth metal;
M is V, Cr, Mo, Mn, Fe, Co, Ni, Cu or a mixture of two or more thereof;
D is Zr, Ti, Hf, Ce, Th, Pr, Nb, Ta, W, Re or a mixture of two or more thereof;
E is Ca, Mg, Sr, Ba, Y, La, Yb, Sm, Gd, Nd, Sc, V, Bi, Ce, Pr, Eu, Tb, Dy, Ho, Er, Tm, Lu or a mixture of two or more thereof;
a is a number in the range of zero up to about 0.2;
u is a number in the range of zero to about 1;
w is the number of oxygens needed to fulfill the valence requirement of A and M;
x is the number of oxygens needed to fulfill the valence requirements of D;
y is the number of oxygens needed to fulfill the valence requirements of E; and
z is a number in the range of about 10 to about 100.

2. The catalyst of claim 1 wherein A is Li, Na, K, Rb, Be, Mg, Ca or a mixture of two or more thereof.

3. The catalyst of claim 1 wherein M is V, Cr or Fe.

4. The catalyst of claim 1 wherein D is Zr, Ce or Th.

5. The catalyst of claim 1 wherein E is Ca, Mg or Y.

6. The catalyst of claim 1 wherein a is from about 0.05 to about 0.08.

7. The catalyst of claim 1 wherein z is from about 15 to about 30.

* * * * *